United States Patent [19]

Petershack

[11] 4,276,040
[45] Jun. 30, 1981

[54] PINTLE CHAIN HAVING EXTENDED WEAR BARREL SECTION AND SPROCKET THEREFOR

[75] Inventor: Victor D. Petershack, Elm Grove, Wis.

[73] Assignee: Rexnord Inc., Milwaukee, Wis.

[21] Appl. No.: 103,786

[22] Filed: Dec. 14, 1979

[51] Int. Cl.³ .......................... F16H 7/06; F16G 13/08
[52] U.S. Cl. .......................................... 474/229; 59/7; 59/85; 198/853; 474/234
[58] Field of Search ................ 59/7, 85; 474/227, 228, 474/229, 230, 232, 233, 234; 198/834, 851, 853

[56] References Cited

U.S. PATENT DOCUMENTS

| | | | |
|---|---|---|---|
| 310,997 | 1/1885 | Heald | 474/234 |
| 393,220 | 11/1888 | Dodge | 474/232 |
| 1,451,625 | 4/1923 | Montague et al. | 474/228 |
| 2,412,364 | 12/1946 | Sivyer | 198/728 |
| 3,192,785 | 7/1965 | Pearson | 474/228 |
| 4,050,323 | 9/1977 | I'Anson | 198/853 |
| 4,114,467 | 9/1978 | Petershack | 198/851 |

Primary Examiner—C. J. Husar
Assistant Examiner—Conrad Berman

[57] ABSTRACT

The barrels of the links of pintle chain for operation open end forward over a drive sprocket are extended inwardly respecting the tooth pockets of the sprocket and two, flat separately distinct areas of interengagement are provided. The two areas of interengagement include the bottom face of the barrel and the bottom face of the tooth pocket and the forward tooth face and rear barrel face. The intermediate corners of the tooth pockets and of the barrel are rounded only for practical purposes.

6 Claims, 3 Drawing Figures

PINTLE CHAIN HAVING EXTENDED WEAR BARREL SECTION AND SPROCKET THEREFOR

BACKGROUND OF THE INVENTION

Each link of pintle chain includes a barrel which connects the sidebars at the closed end of the link. The side bars are offset outwardly at the open end of the link and are fitted with a connecting pin to extend through and turn in the bore of the barrel of the next adjacent link. In a conveyor chain, for example, where the chain is under maximum tension in approaching the drive sprocket and is otherwise under less or nominal tension, pintle chain is operated with its open end forward. The advantage here is in that the pin of the link engaging the sprocket under tension turns in the barrel of the next preceding link and the barrel of the link only turns relative to the sprocket while disengaging the sprocket and only while under relatively less or nominal tension. This is well understood. It is somewhat less well understood that no such advantage is obtained in the use of pintle chain operating in either direction and/or between drive and driven sprockets of similar diameters.

The object of the present invention is to extend the wear life and servicability of a pintle chain and its drive sprocket. Applications which include a driven sprocket, as such, are excluded here. However, the chain of the present invention can operate over guide or return sprockets which do not require any significant force to effect their turning. Applications where the chain leaving the drive sprocket is under significant tension, are also excluded here. The present invention has the following enumerated advantages:

(1) The unique shape extends the life of chain by placing material at those areas on the barrel (or bushing) where wear is known to occur.

(2) The unique shape reduces the stress at the interface between the chain and the sprocket from "line" pressure to "area" pressure, which reduces the wear.

(3) The shape approximates that of the sprocket tooth which distributes the chain load over a wide area of the sprocket, reducing sprocket tooth wear.

(4) The area in contact with the bottom diameter allows for reduced pressure and less wear from movement of chain through the pitch line clearance of the sprocket as each chain link rotates on the sprocket.

(5) If the chain were to move out of the tooth pocket, to accomodate chain elongation then this unique shape will allow for more chain elongation before the chain malfunctions.

(6) A more economical base material is made possible, like nonmetallics of acetal resin or nylon resin et al., because of the favorable distribution of the chain load on the sprocket.

(7) A symmetrical-shaped bushing allows for added chain life since the chain can be "turned over."

(8) More barrel area is required to assure turning of some idler wheels which is accomplished by this shaped barrel.

SUMMARY OF THE INVENTION

Each link of a pintle chain for operation over a drive sprocket has a pin of selected diameter and a barrel having a bore in which the pin of the following link is turnable. The forward and rear barrel wall portions are of less thickness than the pin. The thicker intermediate portions which extends into the tooth pocket has a flat bottom face to engage the bottom of the tooth pocket and a flat rear face to be engaged by the flat forward tooth face of the sprocket. Therefore, increased wear life of the chain and sprocket is provided without accelerating the wear of the sprocket.

DESCRIPTION OF THE PREFERRED EMBODIMENT SHOWN IN THE DRAWINGS

Figure 2:
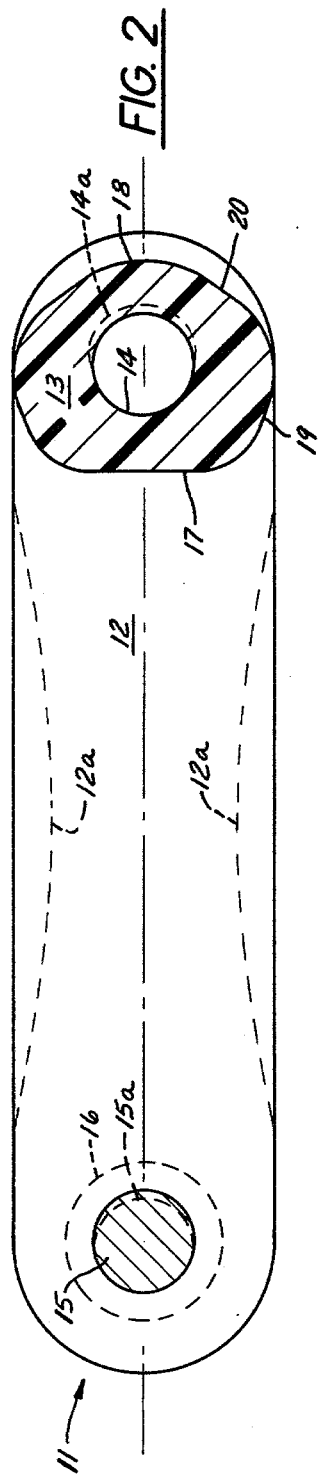
FIG. 2 is a section of the link taken on line 2-2 of FIG. 1. The link is also symmetrical with respect to its center plane as shown. Broken lines show the direction of wear of the pin and of the barrel of the link. Other broken lines indicate an alternate form of the link sidebars.
Figure 1:
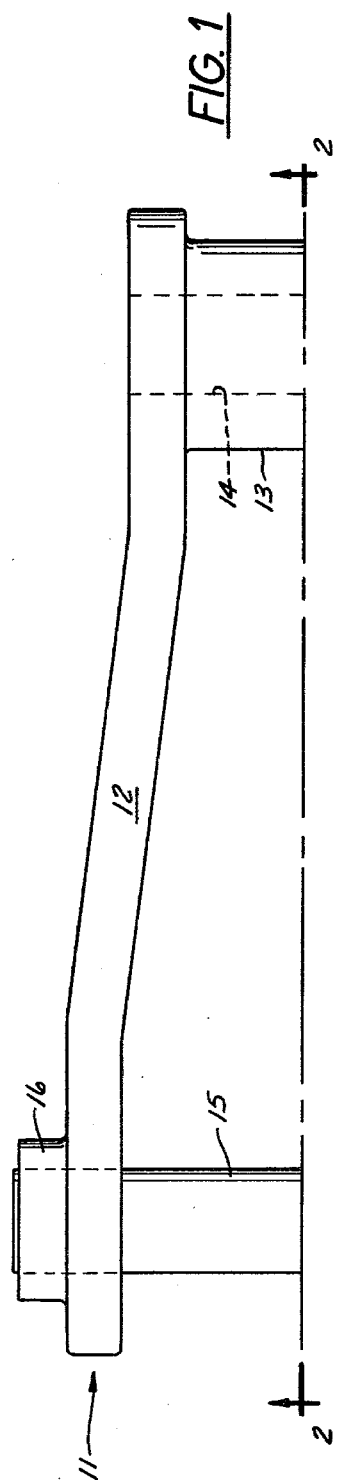
FIG. 1 is a plan of one half of a link of the chain of the present invention. The link is symmetrical with respect to its centerline which is shown.

The link 11 shown in FIGS. 1 and 2 includes the offset sidebars 12 and the barrel 13 at one end of the link. The broken lines 12a of FIG. 2 indicate an alternate, indented form of sidebars 12.

Barrel 13 connects the two sidebars of the link, and is provided with the bore 14 at one end of the link. The ends of the removable pin 15 are carried in the bosses 16 of the sidebars at the other end of the link. The chain of the present invention comprises a closed series of links 11 with the pin 15 of each link extending through and turnable in the bore 14 of the preceding link. The turning axes of the successive pins defines the pitch line of the chain and essentially corresponds with the center plane of each link. The link shown in the drawing is symmetrical respecting its center plane so that for further use it may be turned over with respect to the drive sprocket.

With reference to its center plane, the side of each chain link which is to face and engage the drive sprocket is to be referred to as the lower side. As such, the lower half of barrel 13 to be further described is provided with a flat forward face 17 and a rounded end face 18. The two flat faces which are to engage the drive sprocket according to the invention include the bottom face 19 and the rear face 20. Barrel 13 is suitable rounded intermediate the faces 17 and 19. For illustrative purposes and not by way of limitation, the rounded portions referred to may have a radius of in the order of ⅜ that of pin 15.

Figure 3:
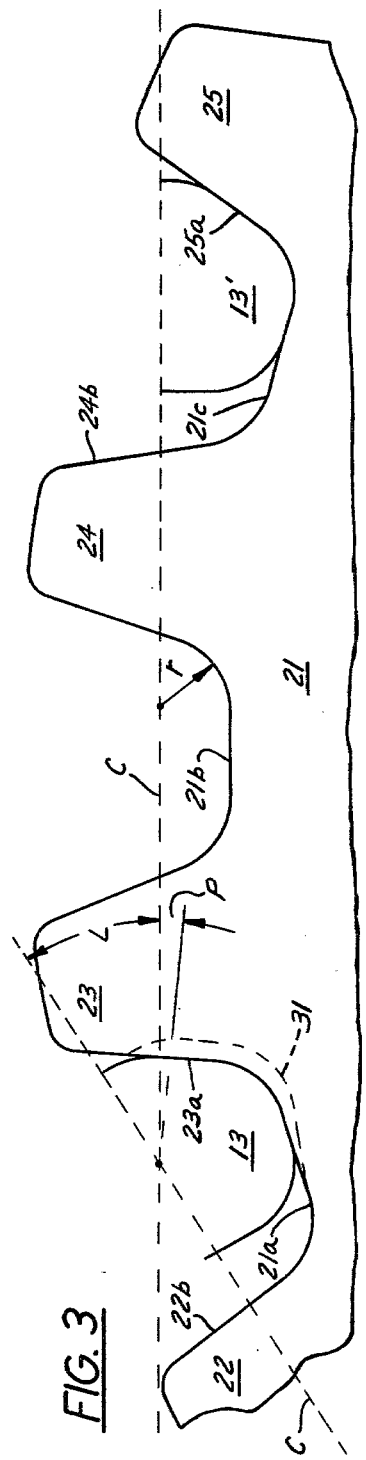
FIG. 3 shows a portion of a sprocket in side elevation. The particular sprocket shown has twenty-three teeth of which four are shown. The barrels of two links in engagement with two sprocket teeth are partially shown in outline only.

A drive sprocket 21 for the chain of the present invention is shown in part in FIG. 3 and includes the four sprocket teeth 22-25 which are shown. The outer faces 21a, 21b and 21c of sprocket 21 form the bottoms of the three tooth pockets intermediate teeth 22-25. Each tooth has a flat forward face such as at 23a, and a flat rear face such as at 22b. The portions of the sprocket between the adjacent tooth faces and sprocket bottoms is suitable curved with a radius (r, FIG. 3) which by way of illustration, and not limitation, may be curved with a radius not less than the corresponding portions of barrel 13.

The outline of the lower part of barrel 13 and the outline of the lower part of a barrel 13' of the following link are also shown in FIG. 3. Each link spans two sprocket teeth and following normal practice sprocket 21 includes an odd number of teeth that the number of barrel engagemnts per sprocket revolution are reduced and the wear-life of the sprocket teeth is extended. The broken lines C indicate the center plane of line 11 and of the following link which includes barrel 13'. The articulation of the two links about the intersection of their center planes is indicated by the angle L.

With reference to FIGS. 2 and 3 together, the lower face 19 of barrel 13 engages and fits the bottom face 21a of sprocket 21 and the rear face 20 fits and is engaged by the forward tooth face 23a of tooth 23. By way of defining the present invention, the angle between lower face 19 and the center plane of the link is one half of angle L and the angle between rear face 20 and the center plane of link is the reciprocal of (P&L) where P is the selected pressure angle. The pressure angle P referred to is shown in FIG. 3. This angle is usually in the order of 5° or more for pintle chain of the type shown and in many instances can be in the order of 2° or less in the pintle chain of the present invention. As shown in FIG. 3, the angularity of the rear face 20 of barrel 13 and the angularity of the forward faces of the teeth of sprocket 21 are such that there is no difference in their relative angularities when the link is in full engagement with the sprocket. The two faces then have a perfectly flat fit. In practice and within limits, of course, there may be some difference in the angularities referred to. It is possible also for the sprocket teeth to have the normal or usual pressure angles as long as the angular difference referred to is, within limits for example, within ±2°.

For the operation of the chain and to allow for its elongation due to wear, a clearance is provided between rear face 22b of tooth 22 and the forward face 17 of barrel 13. The forward face is substantially normal to the center plane of the link. This angle is not critical to the present invention. However, it may be mentioned that the forward face 17 will engage the teeth of the turn one or more idler or guide sprockets in a typical installation. The angularity of face 17 and of the rear faces of such sprockets should, of course, have some attention.

The broken lines 14A and 15a of FIG. 2, respectively, indicates the direction of wear of barrel 13 and of pin 15 which results in chain elongation. Th amount of such wear and elongation, of course, depends on the materials of the two parts and the operating environment of the chain. Similarly, the broken line 31 in FIG. 3 indicates the generally expected wear of the sprocket 21, depending also on the materials.

As may be appreciated from the foregoing description and the drawings, all of the enumerated advantages are provided because of the added material which may be worn away before the chain must be replaced due to chain elongation and/or weakening of the barrel due to wear. Referring to FIG. 2, the wall thickness of barrel 13 is measured radially from its bore 14. The forward and rear portions of barrel 13 are of a thickness which is less than the diameter of bore 14 or the diameter of pin 15. Comparatively, the thickness of barrel 13 is much greater toward the bottom face of the sprocket or toward the center of the sprocket. For purposes of scale and comparison, the thickness of that portion of the barrel 13 referred to is in the order of one and one half times the diameter of pin 15. While this ratio is, of course, only a convenient generalization, it is believed to be appropriate to and sufficiently definite in describing the invention over the prior art. Additionally, the added thickness is in the direction of the center of the sprocket rather than normal to or rearward of the link. It should be understood that the invention may be embodied in chain whether or not the barrel is for one sided or two-sided operation.

I claim:

1. A pintle chain and drive sprocket in combination, each chain link having a pin turnable in the barrel of the next preceding link, the sprocket having substantially flat radially outward faces between teeth and flat forward tooth-faces, each barrel having a flat lower face and a flat rear face for engagement respectively with an outward face and a forward face of a sprocket tooth, the angularity of the rear barrel face relative to the center plane of the link being the complement of (P&L) where P is a selected minimum pressure angle and L is the angle of articulation of adjacent links whereby the wear life of the described combination is greater than the wear life of a similar combination having conventionally rounded barrels and tooth pockets.

2. The combination of claim 1 wherein the adjacent portions of the adjoining flat faces of the barrels are rounded with their radius being limited to such as two-thirds that of the pins.

3. The combination of claim 2 wherein the corners of the tooth pocket intermediate the faces defining the pocket have a radius of not less than that of the rounded barrel portions.

4. The combination of claim 1 wherein each tooth of the sprocket is symmetrical respecting its radial center line.

5. The combination of claim 1 wherein the barrel of each link is symmetrical respecting its center plane.

6. A pintle chain for operation open end forward over a drive sprocket having tooth pockets of limited width, each link having a pin of a selected diameter and a barrel having a bore in which the pin of the following link is turnable, the forward and rear portions of the barrel each being of less thickness than said pin as for entry in the sprocket tooth pockets, the intermediate portion of each barrel being extended for increased wear such that it has a thickness in the order of 1-½ times that of the pin, said intermediate portion having a flat bottom face to engage the bottom of a tooth pocket and a flat rear face which is to be engaged by a forward tooth face of the sprocket.

* * * * *